United States Patent [19]
Colato

[11] 3,708,086
[45] Jan. 2, 1973

[54] DIVIDED PLATE COVER AND PLATE
[75] Inventor: Albert E. Colato, St. Paul, Minn.
[73] Assignee: Plastics, Inc., St. Paul, Minn.
[22] Filed: Dec. 28, 1970
[21] Appl. No.: 101,958

[52] U.S. Cl. ................220/20, 220/44 R, 220/60 R
[51] Int. Cl. .............................................B65d 1/24
[58] Field of Search ........220/20, 23.83, 60 R, 23.86, 220/23.4, 23.8, 44 A, 44 R

[56] References Cited
UNITED STATES PATENTS
2,811,152   10/1957   Wicks ............................220/60 R X
3,240,610   3/1966   Cease ............................220/23.4 X Primary Examiner—M. Henson Wood, Jr.
Assistant Examiner—Edwin D. Grant
Attorney—Robert M. Dunning

[57] ABSTRACT

A two part plate and cover is made up of a divided or compartmented cover, and a serving plate. Food is prepared into the divided cover, and the serving plate is attached thereto as a cover. The food is normally quick frozen or can be packed either chilled or heated and stored until delivered to the user. The serving plate is raised into a heating position in which steam may vent, and the assembly is heated. The serving plate is again sealed relative to the divided cover, inverted, and the divided cover is removed to leave the food nicely distributed on the serving plate. The structure is sealed adequately for storage, and when partially opened, the plate provides adequate venting for food reconstitution.

8 Claims, 11 Drawing Figures

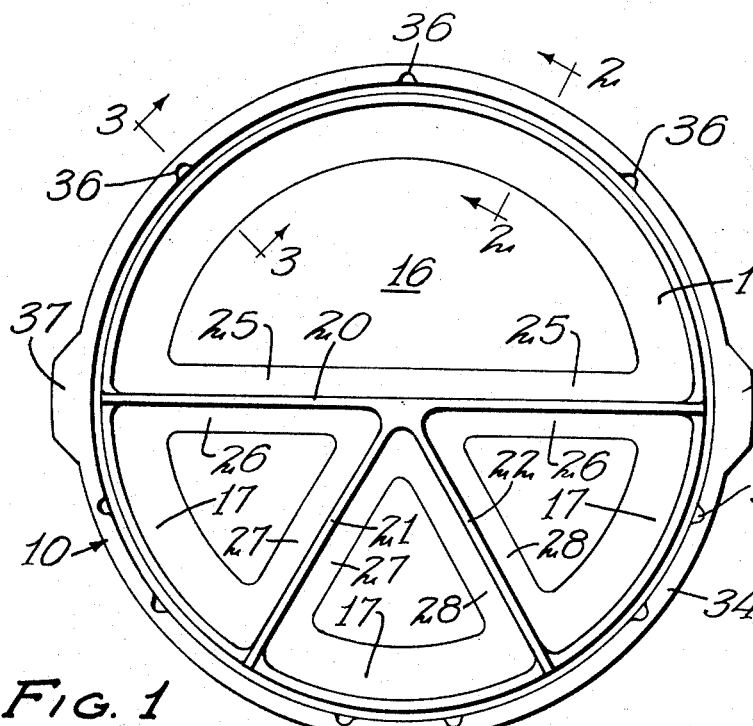
FIG. 1
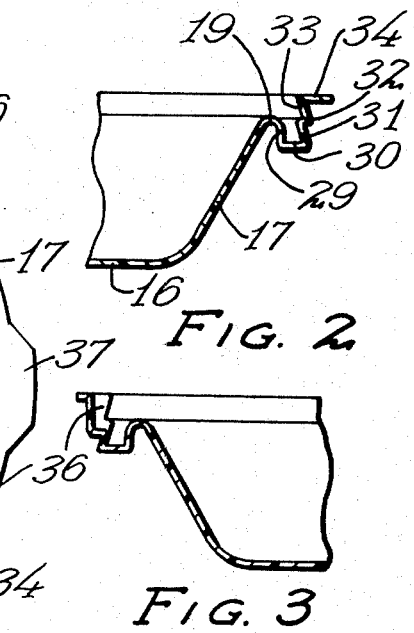
FIG. 2
FIG. 3
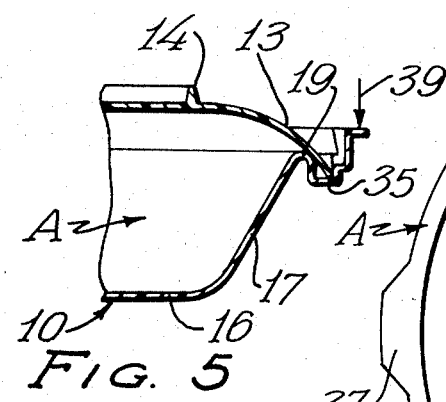
FIG. 5
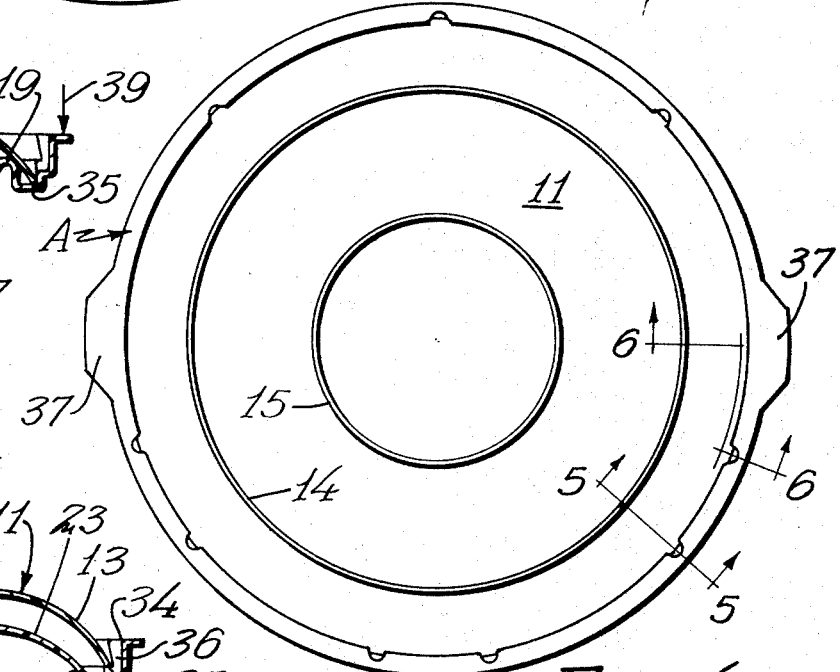
FIG. 4
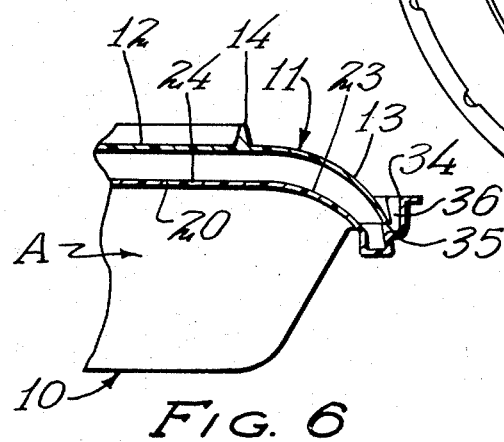
FIG. 6
PATENTED JAN 2 1973
3,708,086
SHEET 1 OF 2
INVENTOR
ALBERT E. COLATO
BY Robert M. Dunning
ATTORNEY

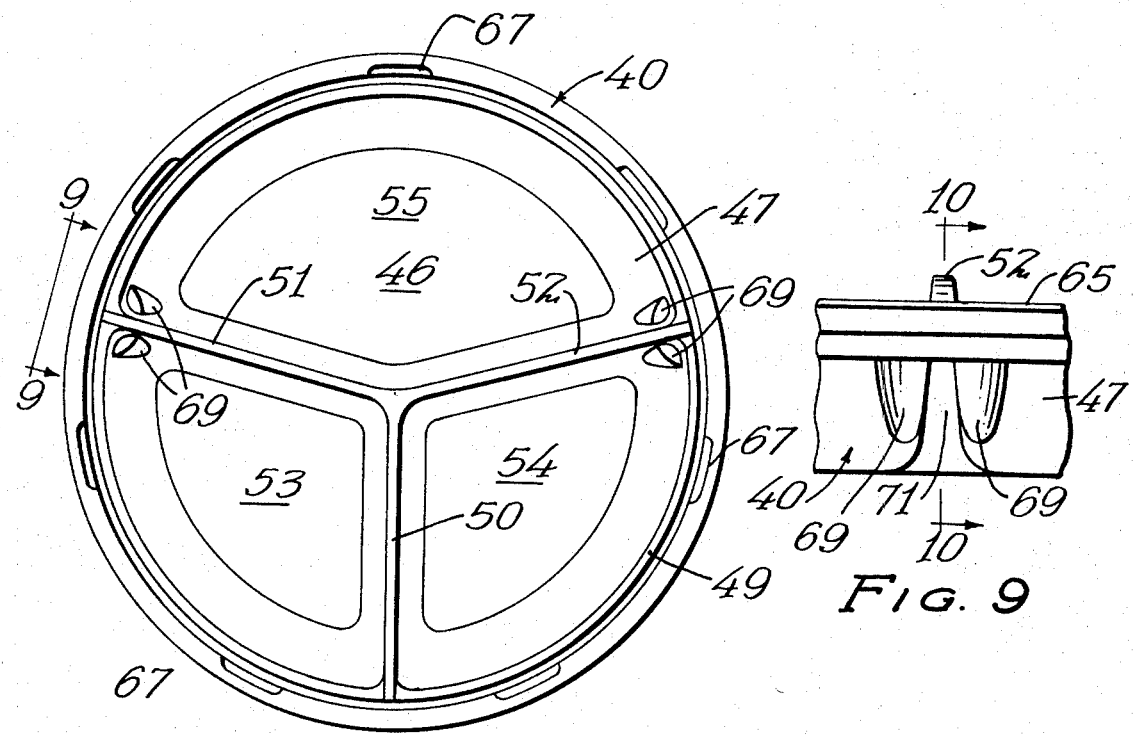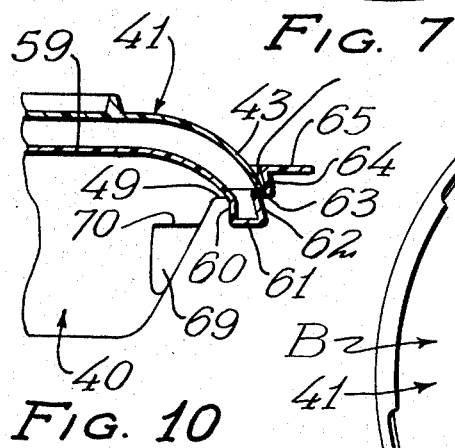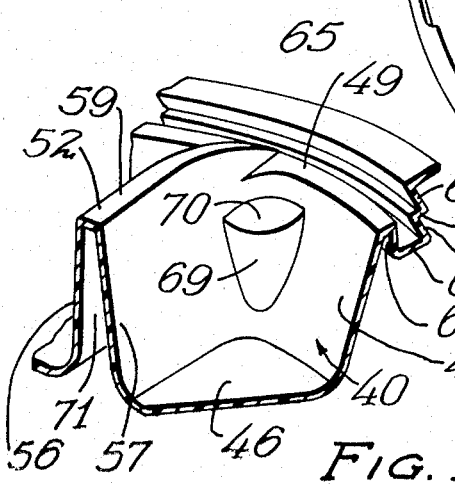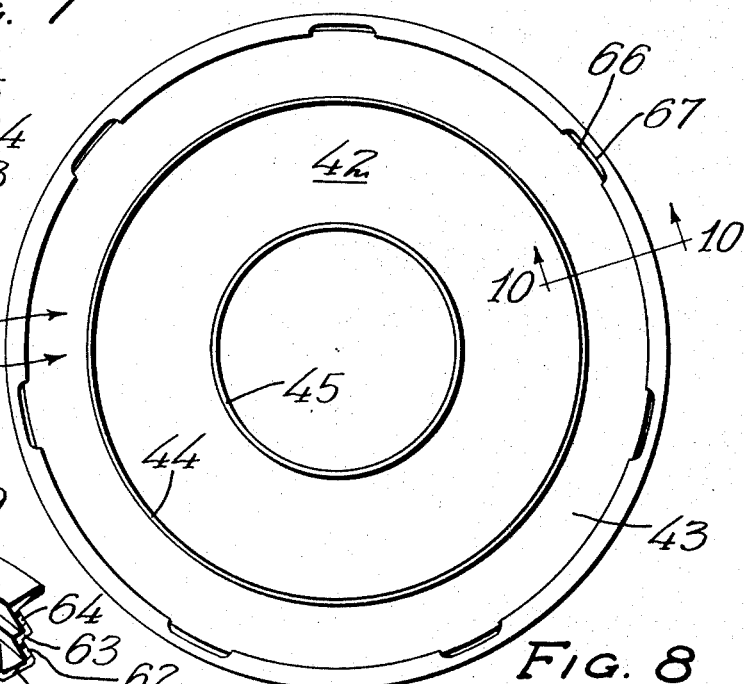

3,708,086

DIVIDED PLATE COVER AND PLATE

This invention relates to an improvement in food packaging and deals particularly with a compartmented cover for containing an individual serving of food during freezing and reheating, and which provides a serving plate for the heated meal.

BACKGROUND OF THE INVENTION

One of the problems involved in the serving of food lies in the fact that various servings of food, when placed upon a plate, have a tendency to merge together so that one vegetable may slide into another, or a vegetable may intermix with the meat, fish or other entree on the plate. In a restaurant, it is only necessary for a waiter or waitress to place the food attractively on the plate, and to carry it to the patrons. However, in the preparation of food for service for institutions, the food is usually placed upon a plate and immediately frozen, and delivered to the kitchens in this frozen state. Before service to the customer or patient, the plate is placed in a microwave oven, heated thoroughly, and then served. It is often extremely difficult to go through this procedure without having the food on the plate intermix together, at least to some extent, which detracts from the appearance of the food when served and also results in intermingling of flavors from the various items.

The difficulty is also emphasized by the fact that a varied menu including numerous different entrees and vegetables is necessary for all hospitals and institutions. Much of the difficulty involved in keeping the food on the dish separated could be eliminated by the use of a plate having a plurality of compartments in which the different servings are contained. However, serving food on a divided plate is objectionable to many persons. Divided plates are commonly used in the serving of food to small children and in institutions, and many people associate such plates accordingly. Thus many people who dislike having food served to them with servings intermixed object to the use of divided serving plates.

In the preparation of food it is necessary to cover each plate during the freezing and thawing processes not only for sanitary reasons, but to prevent freezer burns. However, when the food is reheated, vapor is given off, preventing the use of sealed containers. An object of this invention lies in the provision of a food container useful both in storing food and in reheating it.

SUMMARY OF THE INVENTION

An object of the present invention resides in the provision of a novel and effective means of maintaining the various foods on a serving plate separated, while eliminating the necessity of serving the food in a divided plate. This is accomplished by combining a divided cover with a plate. At the catering kitchen, the food is inserted into the divided cover, this process requiring much less time and effort than is employed in maintaining the various elements of the meal separated on a serving plate. The divided cover is then covered with a member which comprises the serving plate. The meal thus prepared in then immediately frozen, and is maintained in a frozen condition at least until delivered, thus insuring the quality of the meal from deteriorating.

A feature of the present invention resides in the provision of a combination divided cover and serving plate which fit together and in which the food may be frozen and reheated. The food may be placed upon the divided cover in what actually comprises an assembly line procedure. Thus the speed of preparing the desired number of meal servings is greatly increased.

A feature of the present invention resides in the provision of a divided cover of the type described into which the food is placed, and a serving plate which serves as a closure for the divided cover. The food is placed in the freezer with the divided cover on the bottom, and the food is frozen in this inverted position. The food is usually also heated in this inverted cover position. When the food is ready to serve, the assembly is inverted and the divided cover is removed from the serving plate, leaving the heated food attractively spaced on the serving plate.

A further feature of the present invention resides in the provision of a means of forming a connection between the divided cover and the serving plate which may permit the serving plate to be tightly closed upon the divided cover, or in which the serving plate may be moved to a second position in which air vents are provided during the heating process. After the food has been heated, the serving plate is preferably moved back into sealed relation with the divided cover as the assembly is inverted, to prevent the shifting of the food during this period. The divided cover is then removed and the serving plate may be served while the food is in proper position.

A further feature of the present invention resides in the fact that the divided cover is normally provided with dividing partitions which fit snugly against the serving plate floor during the freezing and inverting operations. The partitions in the divided cover normally bow upwardly from the edges of the cover for this purpose.

These and other objects and novel features of the present invention will be more clearly and fully set forth in the following specification and claims.

BRIEF DESCRIPTION OF THE DRAWINGS

FIG. 1 is a top plan view of the divided cover forming a part of the assembly.

FIG. 2 is a vertical sectional view on the line 2—2 of FIG. 1.

FIG. 3 is a vertical sectional view taken on the line 3—3 of FIG. 1.

FIG. 4 is a top plan view of the completed assembly with the serving plate in inverted position and acting as a cover for the divided cover.

FIG. 5 is a vertical sectional view taken on the line 5—5 of FIG. 4.

FIG. 6 is a sectional view on the line 6—6 of FIG. 4 showing the serving plate in the position it assumed during the food heating process.

FIG. 7 is a top plan view of a modified form of divided cover in inverted position.

FIG. 8 is a plan view of the cover of FIG. 7 with the serving plate in position covering the same.

FIG. 9 is an enlarged side elevational view of a detail portion of the cover, the position of the view being indicated by the line 9—9 of FIG. 7.

FIG. 10 is an enlarged sectional view on the lines 10—10 of FIGS. 8 and 9.

FIG. 11 is a perspective view of a detail portion of the juncture between the rim of the inverted cover and one of the partitions.

DESCRIPTION OF THE PREFERRED EMBODIMENT

As indicated in FIGS. 4, 5 and 6 of the drawings, the assembly A includes a divided cover portion 10 and a serving plate portion 11. It is the combination of these elements which makes up the assembly, the serving plate 11 functioning as a closure for the divided cover until the food is in readiness for serving.

The serving plate 11 comprises a disc-like bottom panel 12 having a curved marginal edge 13, this plate being of generally conventional shape. An outer reinforcing ring 14 and a concentric inner reinforcing ring 15 extend from the convex surface of the plate and act to support the plate during the food serving operation. Prior to this time, the serving plate 11 is in inverted position with the convex surface uppermost and the concave surface on its underside.

The divided cover 10 may vary in form depending upon the food to be placed thereupon. In the arrangement illustrated, the divided cover 10 includes a bottom panel 16 having an upwardly and outwardly inclined peripheral wall 17 which terminates in a reversely curved upper lip 19. The interior of the divided cover includes dividing partitions. In the form illustrated, a first partition 20 extends diametrically across the cover between the inclined walls 17, and angularly spaced partitions 21 and 22 extend radially from the center of the cover to the periphery thereof. The angular spacing between the partitions 21 and 22 may vary according to the size of compartments desired. In the particular arrangement illustrated, the partition walls 21 and 22 are approximately 60° apart, and are also 60° from the cross partition 20 so as to divide one-half of the cover into three different compartments. The larger compartment on one side of the partition 20 is normally used to contain the entree of the meal, while the three other compartments are used to contain the other components of the meal.

As is indicated in FIG. 6 of the drawings, the partitions bow upwardly as indicated at 23 adjoining the juncture with the rim 19. Also in the present construction, the divided cover is formed of thin plastic of substantially uniform thickness and the partitions incline upwardly from the bottom panel 16 to the upper rounded edge 24 of the partitions. This arrangement leaves corresponding hollows or grooves beneath the partition walls, the partitions being of generally inverted V-shaped in cross-section so as to provide walls which slope from the rounded upper edges such as 24 of the partition to the bottom panel 16. In other words, the plate is divided into generally pie-shaped segments, the walls of the segments tapering. As a result, when the food is placed into the compartments the food segments placed therein taper toward the bottom panel 16. The tapered walls on opposite sides of the central partition 20 are indicated by the numerals 25 and 26. The walls on the opposite sides of the partition 21 are indicated by the numeral 27. The walls on opposite sides of the partition 22 are indicated by the numeral 28. As was previously stated, the outer peripheral inclined wall of the plate is indicated by the numeral 17.

With reference now to FIG. 2 of the drawings, it will be noted that the rounded upper lip 19 of the peripheral walls 17 of the divided plate 10 extend downwardly as indicated at 29 then outwardly as indicated at 30, and upwardly as indicated at 31. The peripheral wall 31 tapers slightly inwardly and upwardly. The upper end of the channel portion 31 is connected by an outwardly offset portion 32 to a second inwardly and upwardly inclined peripheral wall 33. The wall 33 terminates in an outwardly directed peripheral flange 34.

The purpose of this arrangement is to hold the serving plate in either of two positions, one of which is shown in FIG. 5 and the other of which is shown in FIG. 6. In FIG. 5, the curved edge 13 of the serving plate 11 engages against the rounded rim 19 of the divided plate and extends into the channel at the juncture between the channel bottom 30 and the channel wall 31. As indicated in FIG. 6, in the raised position of the serving plate 11, the marginal edge 35 of the serving plate rests against the offset 32 and at the juncture between this offset and the upwardly and inwardly inclined wall 33.

Vent grooves 36 are provided in the peripheral walls of the retaining channel, one such groove 36 being indicated in FIG. 3 of the drawings. As will be seen, the grooves 36 extend into the outer wall 31 of the channel. As is indicated in FIG. 6 of the drawings, these grooves 36 extend beyond the peripheral edge 35 of the serving plate 11 when the serving plate is in the raised position shown in FIG. 6.

Ears 37 are provided on diametrically opposite sides of the flange 34. It should be explained that at least the divided cover portion of the assembly is made of material sufficiently flexible and resilient so that the serving plate may be pushed down into the position shown in FIG. 5 of the drawings, the outer walls of the channel-shaped edge of the divided cover flexing to admit the marginal edge 35 of the serving plate 11. However, by applying downward pressure on the peripheral flange 34 in the direction of the arrow 39 shown in FIG. 5 of the drawings, the rim of the divided cover will flex sufficiently to allow the serving plate to move into the position shown in FIG. 6.

In operation, food is placed into the divided cover 10 and the serving plate 11 is pressed down on the top thereof, the marginal edge 35 of the serving plate being pressed down into the channel shaped rim of the divided cover into the position shown in FIG. 5 of the drawings where the plate and cover are sealed together. While in this position, the assembly is placed into or conveyed through a freezing unit where the food is quick frozen.

When the food is to be heated, the channel-shaped rim of the divided cover is flexed outwardly, allowing the serving plate to move into the position shown in FIG. 6. The assembly is placed into a microwave oven when in this position. Heating the food usually causes steam to develop which is permitted to escape through the vent grooves 36. When the assembly is removed from the oven the serving plate 11 is pressed downwardly, forcing it back into the position shown in FIG. 5. The assembly is then inverted so that the serving plate is beneath the divided cover. The ears 37 are used to expand the channel-shaped rim of the divided plate and the divided plate is removed, leaving the food properly positioned on the serving plate.

The modified form of construction of divided plate cover and plate B is shown in FIGS. 7 through 11 of the drawings. The structure includes a divided cover 40 and a serving plate 41. The serving plate 41 includes a disc-like bottom 42 having a curved marginal edge 43, this plate being of generally conventional shape. Concentric reinforcing rings 44 and 45 extend from the convex surface of the plate to terminate on a substantially common plane. The plate 41 may be identical to the serving plate 11.

The divided cover 40 is shown as including a bottom panel 46 having an upwardly and outwardly inclined peripheral wall 47 which terminates in a reversely curved upper lip 49. The interior of the divided cover includes dividing partitions. A first partition 50 extends from the wall 47 to the center of the plate, and additional partitions 51 and 52 extend from the center of the plate in diverging relation to the wall 47. These partitions are arranged to provide a pair of similar smaller compartments 53 and 54 on opposite sides of the partition 50, and a somewhat larger compartment 55 defined by the wall 47 and the partitions 51 and 52. Obviously, the partitions may be somewhat differently arranged if it is so desired.

In view of the fact that the cover 40 is preferably formed of relatively thin plastic which is flexible, the disc-like bottom panel 46 is interrupted by the partitions, and each partition, such as the partition 52 shown in FIG. 11 of the drawings, is formed by a pair of upwardly inclined walls 56 and 57 which terminate in an upper edge portion 59. As is indicated in the drawings, the top connecting portion 59 of the partitions is shaped to fit the contour of the serving plate 41 so that the partitions contact the undersurface of the serving plate 41 when the plate is fully engaged therewith.

In the divided cover 40, a marginal edge structure is provided which is similar to that described in conjunction with the cover 10. The reversely curved upper lip 49 extends downwardly as indicated at 60, then extends outwardly as indicated at 61, and then upwardly as indicated at 62. The wall 62 tapers slightly inwardly and upwardly. The upper edge of the rim portion 62 is connected by an outwardly offset portion 63 to a second upwardly and inwardly extending wall 64. The wall 64 terminates in an outwardly directed peripheral flange 65.

The purpose of this arrangement is to provide a construction which will support the serving plate 41 in either of two positions in a manner similar to that previously described with the divided plate cover and plate A. When in its fully lowered position, the marginal edge 66 of the serving plate 41 will rest upon the rounded upper edges 59 of the divided cover 40, and the edge or rim 66 will engage the lower inclined wall 62. When raised slightly, the marginal or peripheral edge 66 of the serving plate will rest upon the offset 63 and be held in place by the upper inclined wall 64. When in fully lowered position, the serving plate is sealed relative to the divided cover, while in raised position vent notches 67 are exposed to permit steam and moisture vapor to escape from the interior of the structure while the food is being heated. The vent notches 67 terminate below the level of the offset 63 and function in the same manner as the vent grooves 36 of the structure A.

The major difference between the structures A and B lie in the thumb depressions 69 which are formed at the ends of the partitions 51 and 52, and which serve to assist in removing the divided cover from the serving plate after the food has been heated and the structure turned right side up so that the serving plate is beneath the divided cover. These thumb depressions are at the juncture between the partition walls 56 and 57 and the inclined wall 47 of the cover. In view of the fact that these thumb depressions 69 are on opposite sides of the partitions, and in view of the fact that the ends 70 of the depressions are on a common plane on opposite sides of the grooves 71 between the walls 56 and 57, the thumbs of the person opening the structure may be inserted in these depressions so that the peripheral edges of the cover may be readily grasped and removed from the serving plate. Due to the fact that the serving plate and its contents are relatively heavy and the fact that the divided cover is formed of thin flexible plastic, the cover may be quickly and easily removed to expose the food on the serving plate.

While this process may seem to include more steps than merely inserting the food in an assembly, freezing it, heating it and serving it, it is actually simple to accomplish due to the flexible resilient character of the material used, and the small wall thickness of the assembly. The serving plate may act as a closure for the divided cover by merely forcing it downwardly. It may be moved from the position shown in FIG. 5 to the position shown in FIG. 6 by merely applying pressure to the rim of the divided cover.

In accordance with the Patent Statutes I have described the principals of operation and construction of my divided plate cover and plate; and while I have endeavored to set forth the best embodiment thereof, I desire to have it understood that obvious changes may be made within the scope of the following claims without departing from the spirit of my invention.

I claim:

1. An assembly including:
   a divided food receiving cover the dividing partitions being bowed outward,
   a substantially flat serving plate having curved peripheral portions to form a food serving container congruent to the outward bowed edges of said partitions,
   peripheral means on said divided cover resiliently engageable with the periphery of said serving plate to releasably hold the two parts in sealed relation.

2. The construction of claim 1 in which said divided food receiving cover partitions substantially engage the surface of said serving plate when said parts are in sealed relation.

3. The construction of claim 1 and in which said divided food receiving cover includes a peripheral channel-shaped rim into which the marginal edge of said serving plate may resiliently engage, said divided cover being formed of resilient material.

4. The construction of claim 3 and in which said channel-shaped rim includes an outer wall having a peripheral offset against which said serving plate may engage, and including vent passages extending into said outer wall extending about said offset.

5. An assembly including:
   a divided cover including a bottom panel and a peripheral upwardly inclined encircling wall, partitions within said encircling wall dividing said cover into a plurality of compartments, a channel-shaped rim encircling the top of said encircling wall, and including inner and outer ring-shaped wall and a connecting base, a serving plate including a bottom panel and a peripheral inclined wall extending about said bottom panel, said serving plate, in inverted position, having its peripheral inclined wall engaged in said channel-shaped rim, said divided cover being formed of material sufficiently resilient to flex to permit engagement of said serving plate wall in said channel-shaped rim, said partitions in said divided cover extending into substantial contact with the concave side of said inverted serving plate, said channel-shaped rim outer wall comprising a pair of upwardly and inwardly inclined wall portions connected by an offset, and in which the peripheral wall of said serving plate may engage either the base of the channel-shaped rim, or said offset.

6. The structure of claim 5 and including vent grooves in said offset.

7. An assembly including:

a divided cover including a bottom panel and a peripheral upwardly inclined encircling wall, partitions within said encircling wall dividing said cover into a plurality of compartments, a channel-shaped rim encircling the top of said encircling wall, and including inner and outer ring-shaped walls and a connecting base, a serving plate including a bottom panel and a peripheral inclined wall extending about said bottom panel, the outer ring-shaped wall of said channel-shaped rim including a pair of upwardly and inwardly inclined wall portions connected by an offset, said serving plate, in inverted position, having its peripheral inclined wall engaged in said channel-shaped rim, and may engage either the base of the channel-shaped rim, or said offset, said divided cover being formed of material sufficiently resilient to flex to permit engagement of said serving plate wall in said channel-shaped rim.

8. The structure of claim 7 and including vent grooves in said offset.

* * * * *